(12) United States Patent
Fagot et al.

(10) Patent No.: US 7,785,683 B2
(45) Date of Patent: Aug. 31, 2010

(54) PUMP CYLINDER AND METHOD OF PRODUCING A THERMOPLASTIC ALLOY FOR ONE SUCH PUMP CYLINDER

(75) Inventors: Christophe Fagot, Mezy (FR); Andre Derouet, Perdreauville (FR)

(73) Assignee: Valois S.A.S, Le Neubourg (FR)

( * ) Notice: Subject to any disclaimer, the term of this patent is extended or adjusted under 35 U.S.C. 154(b) by 882 days.

(21) Appl. No.: 11/596,536

(22) PCT Filed: May 13, 2005

(86) PCT No.: PCT/FR2005/050326

§ 371 (c)(1), (2), (4) Date: Nov. 15, 2006

(87) PCT Pub. No.: WO2005/113673

PCT Pub. Date: Dec. 1, 2005

(65) Prior Publication Data

US 2007/0243090 A1    Oct. 18, 2007

(30) Foreign Application Priority Data

May 17, 2004    (FR) .................................. 04 50967

(51) Int. Cl.
*B29D 22/00* (2006.01)
*B29D 23/00* (2006.01)
*B32B 1/08* (2006.01)

(52) U.S. Cl. .................... 428/36.92; 428/36.9; 428/500; 604/187; 417/572; 417/DIG. 1; 264/478

(58) Field of Classification Search ................ 428/36.9, 428/500, 515, 36.92; 417/572, DIG. 1; 604/187; 264/478

See application file for complete search history.

(56) References Cited

U.S. PATENT DOCUMENTS 3,256,828 A    6/1966    Clinton Rule

FOREIGN PATENT DOCUMENTS

EP    0 714 939 A2    6/1996

*Primary Examiner*—Michael C Miggins
(74) *Attorney, Agent, or Firm*—Sughrue Mion, PLLC

(57) ABSTRACT

The invention relates to a fluid product dispensing pump cylinder which is intended to be assembled to a fluid product tank. According to the invention, the pump cylinder is made from a thermoplastic alloy comprising a mixture of homopolymer polypropylene and high-density polyethylene.

20 Claims, 4 Drawing Sheets

PUMP CYLINDER AND METHOD OF PRODUCING A THERMOPLASTIC ALLOY FOR ONE SUCH PUMP CYLINDER

The present invention relates both to a pump body for dispensing a fluid and designed to be assembled on a reservoir of fluid, and also to a method of fabricating an alloy used in the composition of such a pump body.

An alloy of the invention is particularly suitable for thermoplastic components that are subjected to static or dynamic mechanical stresses, such as pump bodies.

Prior art pump bodies are conventionally made of thermoplastic materials top the thermoplastic material generally used is propylene homopolymer. Propylene homopolymer is a result of polymerizing propylene monomers, thus forming a propylene chain. Pump bodies are often made by injection molding such a polymer. The use of this polymer guarantees impact resistance lying in the range 2 kilojoules per square meter ($kJ/m^2$) to 3 $kJ/m^2$. This resistance can turn out to be insufficient. Risks of deformation or of cracking can arise, in particular while the pump body is being mounted in the opening of a reservoir neck or while the pump body is being dispensed prior to assembly. To mitigate that lack of robustness, proposals have been made to use polypropylene copolymers, e.g. the result of co-polymerizing two monomers such as propylene and ethylene. The impact resistance of such materials can reach values of 7 $kJ/m^2$ to 8 $kJ/m^2$. Nevertheless, those polypropylene copolymers do not satisfy the requirements of regulations governing the pharmaceuticals industry and have therefore not been suitable for use in making pump bodies for dispensing pharmaceuticals.

An object of the present invention is to define a pump body comprising a thermoplastic alloy that does not present the above-mentioned drawbacks.

More particularly, the present invention seeks to provide a pump body that withstands impacts, pressure, and friction.

Another object of the present invention is to provide a thermoplastic alloy conferring perfect leak-tightness to the manufactured pump body.

The present invention also seeks to provide a thermoplastic alloy that makes it possible to make a large number of pump bodies having properties that are constant, in particular concerning ability to withstand hydraulic pressure.

Another object of the present invention is to provide a pump body that is simple to fabricate and of low cost price.

Another object of the present invention is also to provide a pump body comprising a thermoplastic alloy that satisfies the requirements of regulations that apply to the pharmaceuticals industry.

The present invention thus provides a fluid dispenser pump body for assembling on a fluid reservoir, the pump body being characterized in that it is made of a thermoplastic alloy, said alloy comprising a mixture of polypropylene homopolymer and of high-density polyethylene.

Advantageously, said pump body comprises a mixture of about 70% to 90% polypropylene homopolymer and about 10% to 30% high-density polyethylene.

Preferably, said pump body comprises a mixture of about 85% polypropylene homopolymer and about 15% high-density polyethylene.

Advantageously, said pump body presents resistance to impacts greater than 3 $kJ/m^2$, advantageously of the order of 5 $kJ/m^2$ to 6 $kJ/m^2$.

Advantageously, said pump body presents mean resistance to pressure greater than 25 bars, and preferably about 40 bars.

Advantageously, over a plurality of identical components, the standard deviation in the mean resistance to pressure of the alloy is less than 1.5 bars, preferably less than 1 bar.

The present invention also provides a method of fabricating a thermoplastic alloy including the step of mechanically polyblending polypropylene homopolymer and high-density polyethylene.

The invention is described below in greater detail with reference to the accompanying drawings showing three embodiments of the invention as non-limiting examples.

Figure 1:
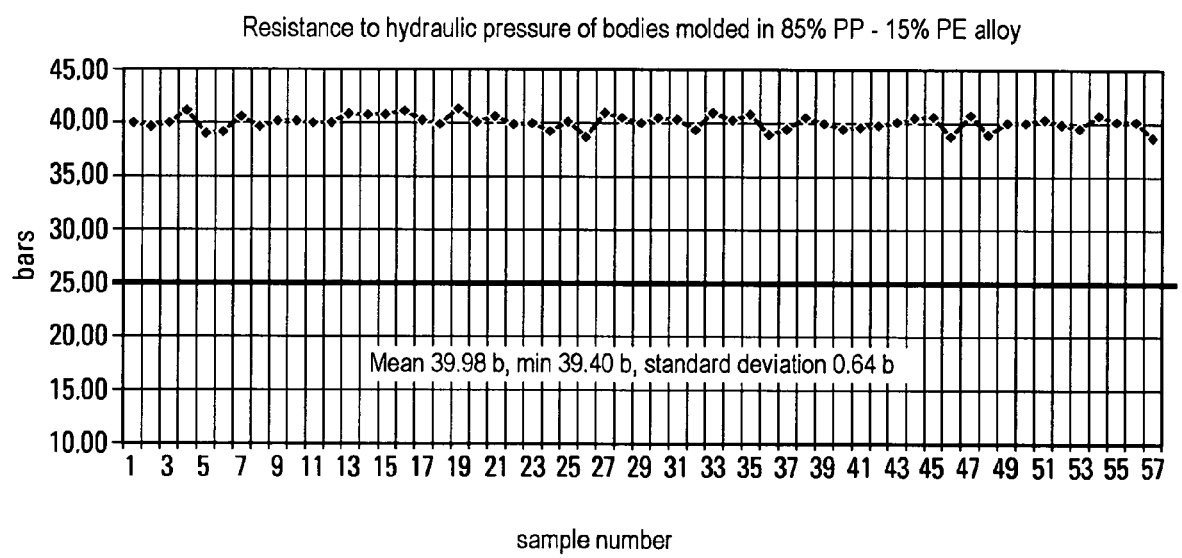
FIG. 1 is a graph showing the resistance to hydraulic pressure of pump bodies molded with an alloy constituting a preferred embodiment of the invention.
Figure 2:
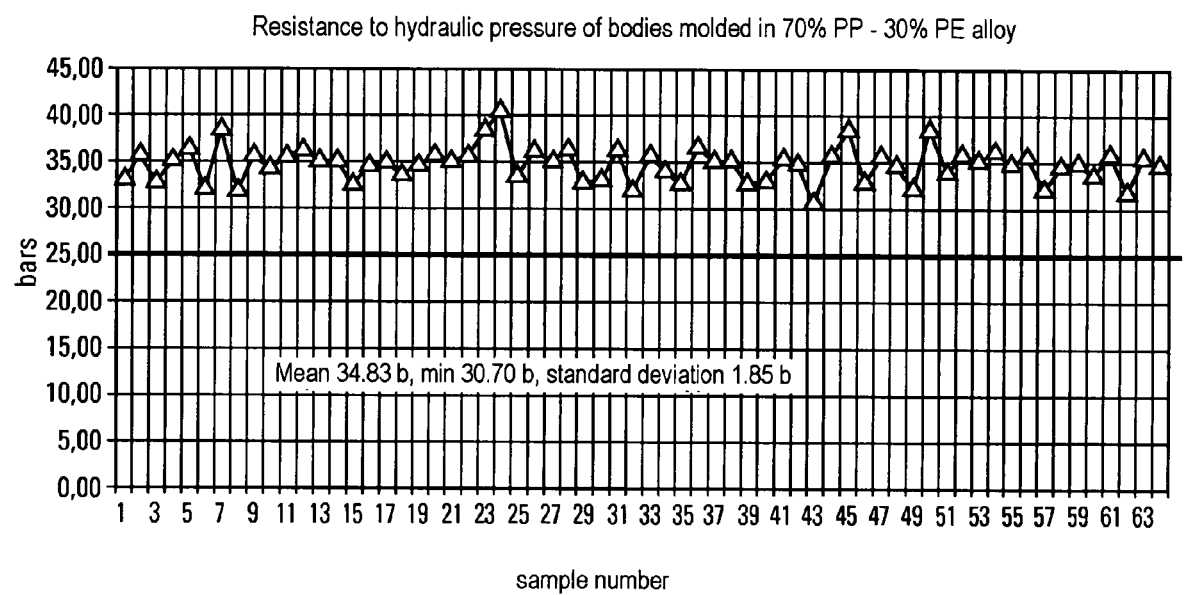
FIG. 2 is a graph showing the resistance to hydraulic pressure of pump bodies molded with an alloy constituting another embodiment of the invention.
Figure 3:
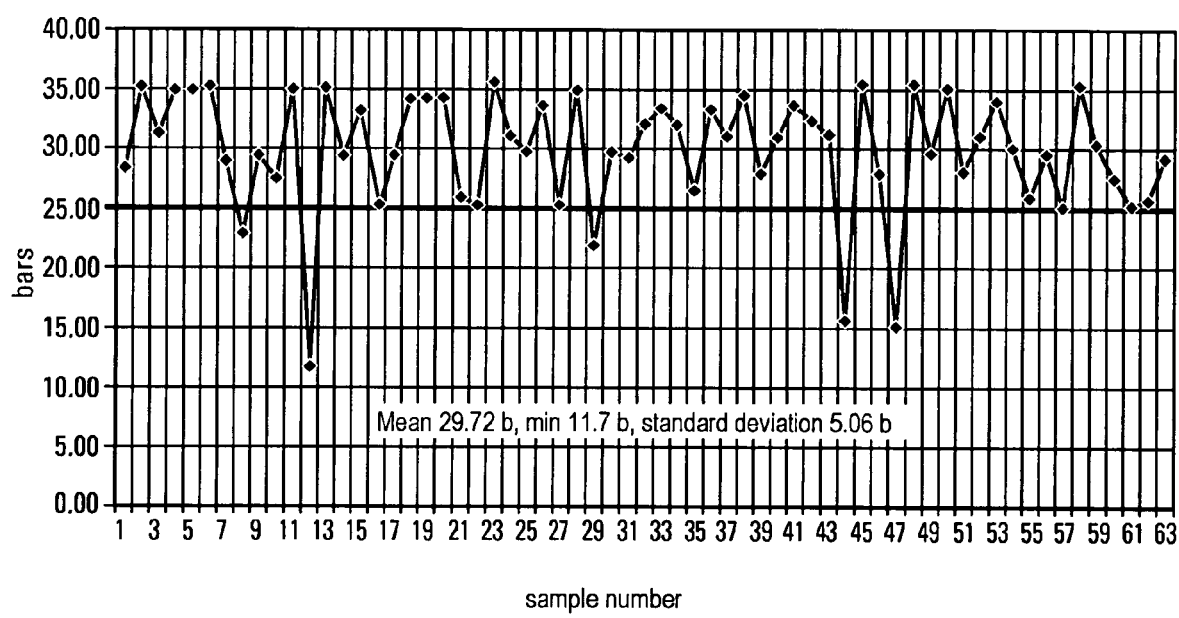
FIG. 3 is a graph showing the resistance to hydraulic pressure of pump bodies molded with an alloy constituting another embodiment of the invention.

The graphs of FIGS. 1 to 3 show the resistance to hydraulic pressure as measured in bars of pump or valve bodies made using thermoplastic alloys in three different embodiments of the invention. The curves plotted in these graphs are the result of taking different measurements of resistance to hydraulic pressure on a certain number of pump bodies. In the present examples, each experiment was carried out on about 60 pump bodies.

On each graph, there can be seen a line that extends level with the resistance to hydraulic pressure having a value of 25 bars. This value corresponds approximately to twice the pressure exerted by a pump sliding in the pump body as a result of being actuated. A pump develops pressure having a value of approximately 12 bars. Thus the line at 25 bars can be thought of as a safety margin. In practice, this margin corresponds to a lower manufacturing tolerance limit comparable to an acceptability threshold for the fabricated component. This limit thus reveals the good quality of a fabricated component, in particular from the point of view of its robustness.

FIG. 1 shows the resistance to hydraulic pressure of pump bodies molded with an alloy comprising 85% polypropylene (PP) homopolymer and 15% high-density polyethylene (PE). It can be seen that this alloy presents mean resistance of approximately 40 bars with the lowest observed resistance being 38.40 bars. In addition, it can be seen that all of the recorded values are situated well beyond the 25 bar line. The standard deviation calculated relative to the mean resistance in this example was 0.64 bars. This standard deviation is very small, which is naturally synonymous with very good reproducibility and repeatability for measured values of resistance to hydraulic pressure.

FIG. 2 shows the resistance to hydraulic pressure of the pump bodies molded using an alloy comprising 70% polypropylene homopolymer and 30% high-density polyethylene. From the results obtained, it can be seen that the measured values are again all situated above the 25 bar line. The mean resistance recorded was approximately 35 bars and the minimum value measured was 30.70 bars. Furthermore, the standard deviation as calculated is 1.85 bars, thus showing that the recorded values fluctuate little.

FIG. 3 shows the resistance to hydraulic pressure of bodies molded with an alloy comprising 90% polypropylene homopolymer and 10% high-density polyethylene. As can be seen, the majority of resistance values recorded are located above the 25 bar line, which likewise demonstrates very good resistance to hydraulic pressure for pump bodies made with such an alloy. In this example, the minimum resistance to pressure is 11.7 bars, but the general average is 29.72 bars, which remains high. Only five measurements out of sixty-three were recorded beneath the 25 bar line, with the other values lying approximately in the range 25 bars to 35 bars. In this example, the standard deviation is greater and reaches a value of 5.06 bars. The results are therefore less reproducible than during the tests performed respectively with the 70% PP homopolymer and 30% high-density PE alloy, or with the 85% PP homopolymer and 15% high-density PE alloy, however they nevertheless remain quite satisfactorily.

Figure 4:
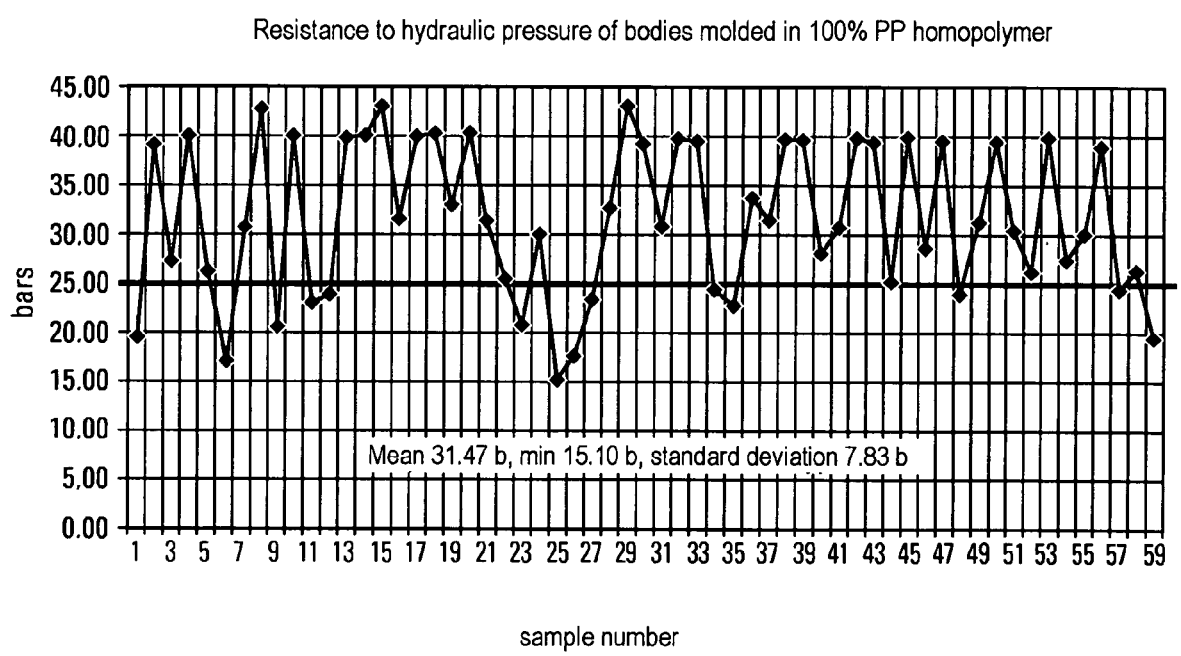
FIG. 4 is a comparative graph showing the resistance to hydraulic pressure of pump bodies molded with a material containing 100% polypropylene homopolymer.

Finally, FIG. 4 shows the resistance to hydraulic pressure of pump bodies made in accordance with the prior art by being molded out of 100% polypropylene homopolymer. This figure thus provides a comparative plot compared with the above-described plots. In this example, it can be observed firstly that there is great non uniformity in the values measured, leading to a large standard deviation of 7.83 bars. In addition, thirteen of the values measured for resistance to hydraulic pressure lie below the 25 bar line, which is much the worst result obtained compared with the alloys being tested. In this example, the mean of the recorded values was 31.47 bars, with a minimum value of 15.10 bars.

Consequently, the use of an alloy of the invention comprising polypropylene homopolymer and high-density polyethylene has the advantage of providing better control over the measured values for resistance to hydraulic pressure. In other words, the measured resistance values are distributed in a manner that is less random, i.e. they are more constant. Thus, with an alloy of polypropylene homopolymer and high-density polyethylene it is possible to observe an amplitude that is very small between the minimum and maximum recorded values. This is particularly true for an alloy comprising 85% polypropylene homopolymer and 15% high-density polyethylene for which the measured values are very close to one another and generally extend approximately in the range 39 bars to 41 bars. Components made with this alloy thus present particularly constant performance and properties.

Furthermore, the mean value for resistance to hydraulic pressure, in particular for alloys comprising 85% of PP homopolymer and 15% high-density PE and for alloys comprising 70% a PP homopolymer and 30% high-density PE are found to be much higher than the mean value obtained for prior art pump bodies. Consequently, the use of an alloy of polypropylene homopolymer and high-density polyethylene confers in general manner greater resistance to hydraulic pressure for fabricated pump bodies, and thus greater solidity with fewer rejects during fabrication, assembly, and/or utilization.

It can be observed that an alloy of the invention presents resistance to impacts greater than 3 kJ/m$^2$, advantageously of the order of 5 kJ/m$^2$ to 6 kJ/m$^2$, thus making it possible to double resistance to impacts compared with that obtained using prior art materials, in particular PP homopolymer. In addition, it should be specified that the alloy of the invention can be used without problem in the context of pharmaceutical activities, since PP homopolymer and high-density PE are approved for this purpose.

The method implemented for fabricating such a thermoplastic alloy includes a step of mechanical polyblending the polypropylene homopolymer and the high-density polyethylene (i.e. mixing the two components after they have polymerized separately).

It should be observed that such an alloy is particularly suitable for pump bodies since such bodies are subjected to high levels of friction, pressure, and impacts. Thus, such an alloy fully satisfies the requirements for pump bodies in terms of impact resistance and/or sliding and/or leaktightness.

An alloy of the invention contributes to improving the performance of the components it forms, in particular by reducing the risk of leaks between the pump body and the piston of a pump. This advantage is obtained by the body presenting better ability to deform to accommodate the particular shape of the piston.

Although the present invention is described with reference to a plurality of variant embodiments thereof, it should be understood that is not limited to the examples described, but that, on the contrary, a person skilled in the art can apply any useful modifications thereto without going beyond the ambit of the present invention as defined by the accompanying claims.

The invention claimed is:

1. A fluid dispenser pump body for assembling on a fluid reservoir, the pump body being characterized in that it is made of a thermoplastic alloy, said alloy comprising a mixture of polypropylene homopolymer and of high-density polyethylene.

2. A pump body according to claim 1, comprising a mixture of about 85% polypropylene homopolymer and about 15% high-density polyethylene.

3. A pump body according to claim 1, in which said alloy presents resistance to impacts greater than 3 kJ/m$^2$, advantageously of the order of 5 kJ/m$^2$ to 6 kJ/m$^2$.

4. A pump body according to claim 1, in which said alloy presents mean resistance to pressure greater than 25 bars, and preferably about 40 bars.

5. A pump body according to claim 1, in which, over a plurality of identical components, the standard deviation in the mean resistance to pressure of the alloy is less than 1.5 bars, preferably less than 1 bar.

6. A method of fabricating a thermoplastic alloy according to claim 1, including the step of mechanically polyblending polypropylene homopolymer and high-density polyethylene.

7. The pump according to claim 1, wherein the thermoplastic alloy is made by mechanically polyblending polypropylene homopolymer and high-density polyethylene.

8. The pump body according to claim 1, comprising a mixture of about 70% to 85% polypropylene homopolymer and about 15% to 30% high-density polyethylene.

9. The pump body according to claim 1, comprising a mixture of about 85% to 90% polypropylene homopolymer and about 10% to 15% high-density polyethylene.

10. A pump body according to claim 1, comprising a mixture of about 70% to 90% polypropylene homopolymer and about 10% to 30% high-density polyethylene.

11. The pump body according to claim 10, wherein the thermoplastic alloy is made by mechanically polyblending polypropylene homopolymer and high-density polyethylene.

12. The pump body according to claim 1, wherein the pump body is made by injection-molding using the thermoplastic alloy, said alloy comprising a mixture of polypropylene homopolymer and of high-density polyethylene.

13. The pump body according to claim 12, wherein the thermoplastic alloy comprises a mixture of about 70% to 90% polypropylene homopolymer and about 10% to 30% high-density polyethylene.

14. The pump according to claim 12, wherein the thermoplastic alloy is made by mechanically polyblending polypropylene homopolymer and high-density polyethylene.

15. The pump body according to claim 12, wherein the thermoplastic alloy comprises a mixture of about 70% to 85% polypropylene homopolymer and about 15% to 30% high-density polyethylene.

16. The pump body according to claim 12, wherein the thermoplastic alloy comprises a mixture of about 85% to 90% polypropylene homopolymer and about 10% to 15% high-density polyethylene.

17. A process of manufacturing a fluid dispenser pump body for assembling on a fluid reservoir, comprising:
  providing quantities of polypropylene homopolymer and of high-density polyethylene,
  mechanically polyblending the quantities of polypropylene homopolymer and the high-density polyethylene to produce a thermoplastic alloy, and
  injection-molding the thermoplastic alloy to form the pump.

18. The process according to claim 17, wherein the thermoplastic alloy comprises a mixture of about 70% to 90% polypropylene homopolymer and about 10% to 30% high-density polyethylene.

19. The process according to claim 17, wherein the thermoplastic alloy comprises a mixture of about 70% to 85% polypropylene homopolymer and about 15% to 30% high-density polyethylene.

20. The process according to claim 17, wherein the thermoplastic alloy comprises a mixture of about 85% to 90% polypropylene homopolymer and about 10% to 15% high-density polyethylene.

* * * * *